(12) United States Patent
Natanzon et al.

(10) Patent No.: US 10,235,247 B1
(45) Date of Patent: Mar. 19, 2019

(54) COMPRESSING MEMORY SNAPSHOTS (71) Applicant: EMC IP Holding Company LLC, Hopkinton, MA (US)

(72) Inventors: Assaf Natanzon, Tel Aviv (IL); Philip Derbeko, Modi'in (IL); Moran Zahavy, Beer-Sheva (IL); Maya Bakshi, Beer-Sheva (IL); Anton Pavlinov, Beer-Sheva (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/275,749

(22) Filed: Sep. 26, 2016

(51) Int. Cl.
*G06F 12/00* (2006.01)
*G06F 13/00* (2006.01)
*G06F 13/28* (2006.01)
*G06F 11/14* (2006.01)
*G06F 12/0893* (2016.01)
*G06F 12/0891* (2016.01)
*G06F 12/123* (2016.01)
*G06F 17/30* (2006.01)
*G06F 9/455* (2018.01)

(52) U.S. Cl.
CPC ...... *G06F 11/1453* (2013.01); *G06F 9/45558* (2013.01); *G06F 12/0891* (2013.01); *G06F 12/0893* (2013.01); *G06F 12/123* (2013.01); *G06F 17/30132* (2013.01); *G06F 17/30233* (2013.01); *G06F 2009/45583* (2013.01); *G06F 2201/815* (2013.01); *G06F 2201/84* (2013.01); *G06F 2212/1032* (2013.01); *G06F 2212/152* (2013.01); *G06F 2212/463* (2013.01); *G06F 2212/60* (2013.01); *G06F 2212/69* (2013.01)

(58) Field of Classification Search
CPC ............. G06F 12/0891; G06F 12/0893; G06F 2201/84; G06F 17/30088
USPC ........................................................ 711/119
See application file for complete search history.

(56) References Cited

U.S. PATENT DOCUMENTS

| | | | |
|---|---|---|---|
| 7,203,741 | B2 | 4/2007 | Marco et al. |
| 7,719,443 | B1 | 5/2010 | Natanzon |
| 7,840,536 | B1 | 11/2010 | Ahal et al. |
| 7,840,662 | B1 | 11/2010 | Natanzon |
| 7,844,856 | B1 | 11/2010 | Ahal et al. |
| 7,860,836 | B1 | 12/2010 | Natanzon et al. |
| 7,882,286 | B1 | 2/2011 | Natanzon et al. |
| 7,934,262 | B1 | 4/2011 | Natanzon et al. |
| 7,958,372 | B1 | 6/2011 | Natanzon |
| 8,037,162 | B2 | 10/2011 | Marco et al. |
| 8,041,940 | B1 | 10/2011 | Natanzon et al. |

(Continued)

OTHER PUBLICATIONS

EMC Corporation, "EMC Recoverpoint/EX;" Applied Technology; White Paper; Apr. 2012; 17 Pages.

*Primary Examiner* — Edward J Dudek, Jr.
*Assistant Examiner* — Sidney Li
(74) *Attorney, Agent, or Firm* — Daly, Crowley, Mofford & Durkee, LLP (57) ABSTRACT

A computer program product, system, and method for generating coded fragments comprises receiving a request to generate a memory snapshot for a virtual machine (VM), copying the VM's memory to generate a memory snapshot, obtaining information about cache structures within the memory snapshot, invalidating one or more of the cache structures and zeroing out corresponding cache data within the memory snapshot, and storing the memory snapshot to storage.

18 Claims, 4 Drawing Sheets

(56) References Cited

U.S. PATENT DOCUMENTS

| | | |
|---|---|---|
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |

(56) References Cited

U.S. PATENT DOCUMENTS

| | | |
|---|---|---|
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,095,489 B1 | 10/2018 | Lieberman et al. |
| 10,101,943 B1 | 10/2018 | Ayzenberg et al. |
| 2003/0221069 A1* | 11/2003 | Azevedo ............ G06F 12/0862 711/136 |
| 2011/0246733 A1* | 10/2011 | Usgaonkar ............ G06F 3/0608 711/162 |
| 2015/0127911 A1* | 5/2015 | Steiss ................ G06F 12/0871 711/123 |
| 2015/0161151 A1* | 6/2015 | Koryakina ........ G06F 17/30088 711/114 |

* cited by examiner

COMPRESSING MEMORY SNAPSHOTS

BACKGROUND

A hypervisor is computer software, firmware, and/or hardware that creates and runs virtual machines (VMs). Hypervisors may support two different types of virtual machine snapshots: with memory and without memory. A snapshot with memory (a "memory snapshot") includes both a snapshot of a VM's storage and a snapshot of the VM's memory at a given point in time. A snapshot without memory (a "nonmemory snapshot") includes VM storage but not memory. Snapshots with memory can be used to restore the state of a VM faster than snapshots without memory, as they allow the VM's guest operating system (OS) to resume without having to perform its normal boot process. Snapshots with memory may reduce startup time by several minutes, particularly for virtualized servers. Existing memory snapshots may be quite large (e.g., 128-1024 GB or larger).

SUMMARY

Described herein are embodiments of systems and methods for decreasing the size of VM memory snapshots. In some embodiments, the described systems and methods can significantly decrease the size of memory snapshots while incurring only a slight performance penalty. In various embodiments, the tradeoff between memory snapshot size and performance is configurable.

According to one aspect of the disclosure, a method comprises: receiving a request to generate a memory snapshot for a virtual machine (VM); copying the VM's memory to generate a memory snapshot; obtaining information about cache structures within the memory snapshot; invalidating one or more of the cache structures and zeroing out corresponding cache data within the memory snapshot; and storing the memory snapshot to storage.

In various embodiments, obtaining information about cache structures within the memory snapshot includes obtaining information about pages used by a filesystem cache or a buffer cache. In certain embodiments, invalidating the one or more cache structures comprises erasing the cache structures from cache. In some embodiments, erasing the cache structures from cache comprises setting an invalid bit within each of the one or more cache structures.

In certain embodiments, obtaining information about cache structures within the memory snapshot includes obtaining information about cache structures used by application processes running within the VM. In one embodiment, invalidating the one or more cache structures comprises selecting the one or more cache structures using a least-recently used (LRU) heuristic. In various embodiments, obtaining information about the cache structures within the memory snapshot comprises using a driver specific to a guest operating system (OS) of the VM.

In some embodiments, the method further comprises compressing the memory snapshot after invalidating one or more of the cache structures and zeroing out corresponding cache data within the memory snapshot, wherein storing the memory snapshot to storage comprises storing the compressed memory snapshot to storage. In one embodiment, storing the memory snapshot to storage comprises storing the compressed memory snapshot to a deduplicated storage system. In certain embodiments, the method further comprises retrieving the memory snapshot from storage, and restoring the VM using the retrieved memory snapshot.

According to another aspect of the disclosure, a system comprises one or more processors; a volatile memory; and a non-volatile memory storing computer program code that when executed on the processor causes execution across the one or more processors of a process operable to perform embodiments of the method described hereinabove.

According to yet another aspect of the disclosure, a computer program product tangibly embodied in a non-transitory computer-readable medium, the computer-readable medium storing program instructions that are executable to perform embodiments of the method described hereinabove.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
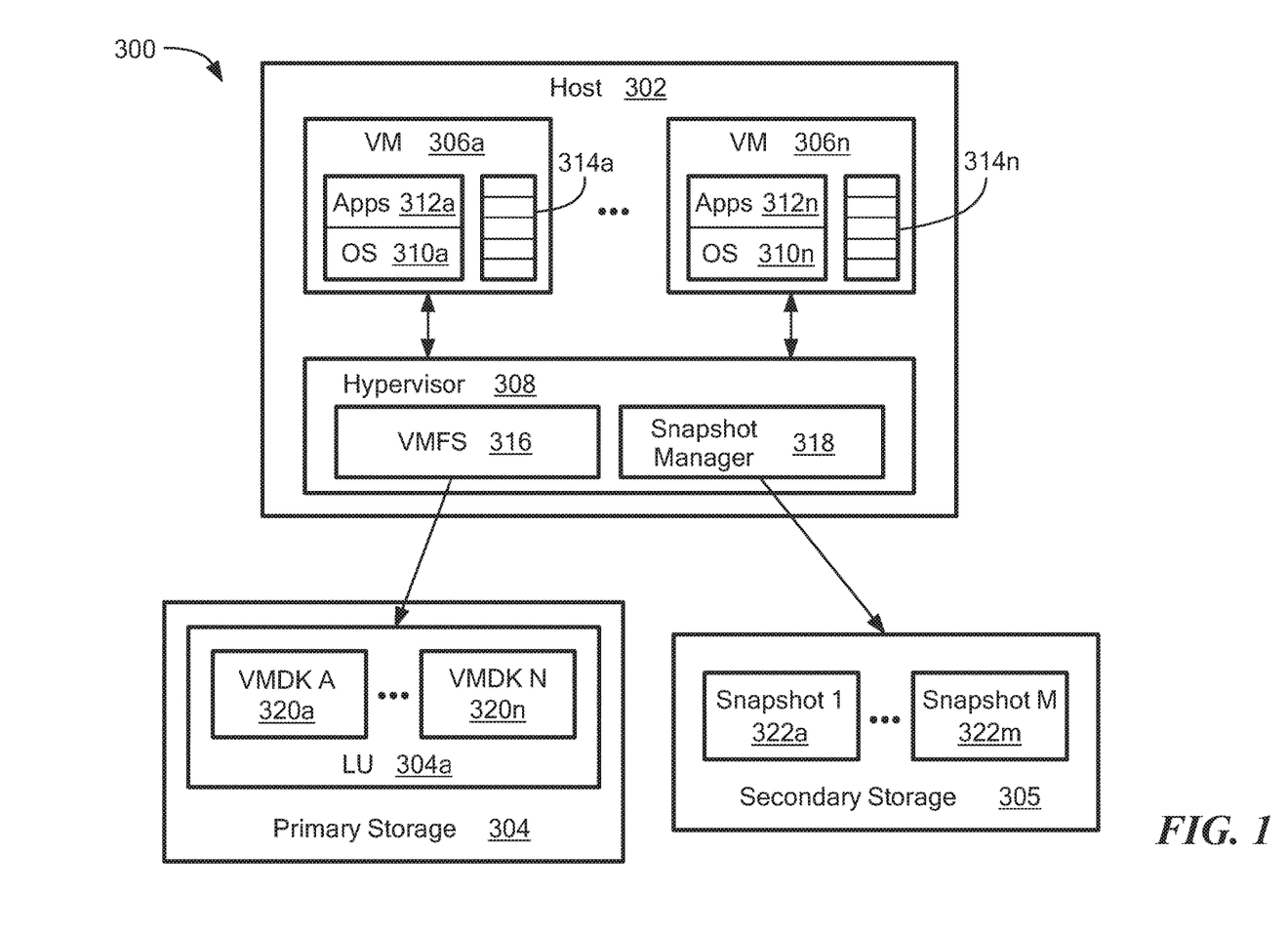
FIG. 1 is a block diagram of a system for compressing memory snapshots, according to an embodiment of the disclosure.

Referring to the embodiment of FIG. 1, a system 300 for compressing memory snapshots includes a host 302, and primary 304 and secondary storage systems 305 coupled thereto. The host 302 includes one or more virtual machines (VMs) 306 managed by a hypervisor 308. Each VM 306 includes a guest operating system (OS) 310, one or more applications 312 that can run on the guest OS 310, and memory 314 that may be used by the guest OS 310 and the applications 312. VM memory 314 may correspond to physical host memory resources (e.g., RAM and/or disk-backed virtual memory) allocated to the VM by the hypervisor 308.

The system 300 includes a VM file system (VMFS) 316 to store files within the primary storage system 304 and managed by the hypervisor 308. In the embodiment of FIG. 1, the VMFS 316 may be stored within one or more LUs (e.g., LU 304a) within primary storage 304 and can include one or more VM disks (VMDKs) 320. In some embodiments, a VMDK is a file within the VMFS used by a corresponding VM to store data used by its OS and applications. In many embodiments, a VM may have multiple VMDKs, one for each disk used by the VM.

Referring again to FIG. 1, the secondary storage system 305 may store one or more VM snapshots 322. A VM snapshot 322 may include one or more files that represent the data and/or state of a VM at a specific point in time. A given VM snapshot 322 may be a memory snapshot (i.e., disk and memory) or a nonmemory snapshot (i.e., disk only). In some embodiments, a VM snapshot is implemented as multiple files within the VMFS: (1) a collection of VMDK (or delta VMDK) files for the virtual disks connected to the VM at the time of the snapshot; (2) a database of the VM's snapshot information (e.g., a file having line entries which define the relationships between snapshots as well as the child disks for each snapshot); and (3) a file that includes the current configuration and, in the case of a memory snapshot, the active state of the VM (e.g., a copy of the VM's memory).

In some embodiments, the primary storage system may be a storage array having one or more logical units (LUs) (e.g., LU 304a). In certain embodiments, the primary storage system may correspond to a disk (or a disk array) directly attached to the host. In other embodiments, the primary storage system may be coupled to the host via a storage area network (SAN). In certain embodiments, the primary storage system may be an EMC® VMAX® system. In particular embodiments, the secondary storage system may be a deduplicated storage system, such as an EMC® DATADOMAIN® system.

Referring again to FIG. 1, the hypervisor 308 includes a snapshot manager 318 configured to generate VM snapshots 322, including memory snapshots and nonmemory snapshots. In some embodiments, memory snapshots may have OS-specific formatting and the snapshot manager may include one or more OS-specific drivers to perform at least a portion of the post-processing; the appropriate driver may be selected based on the VM's guest OS. In certain embodiments, the snapshot manager may be configured to perform at least some of the processing described further below in conjunction with FIGS. 2 and 3.

Figure 2:
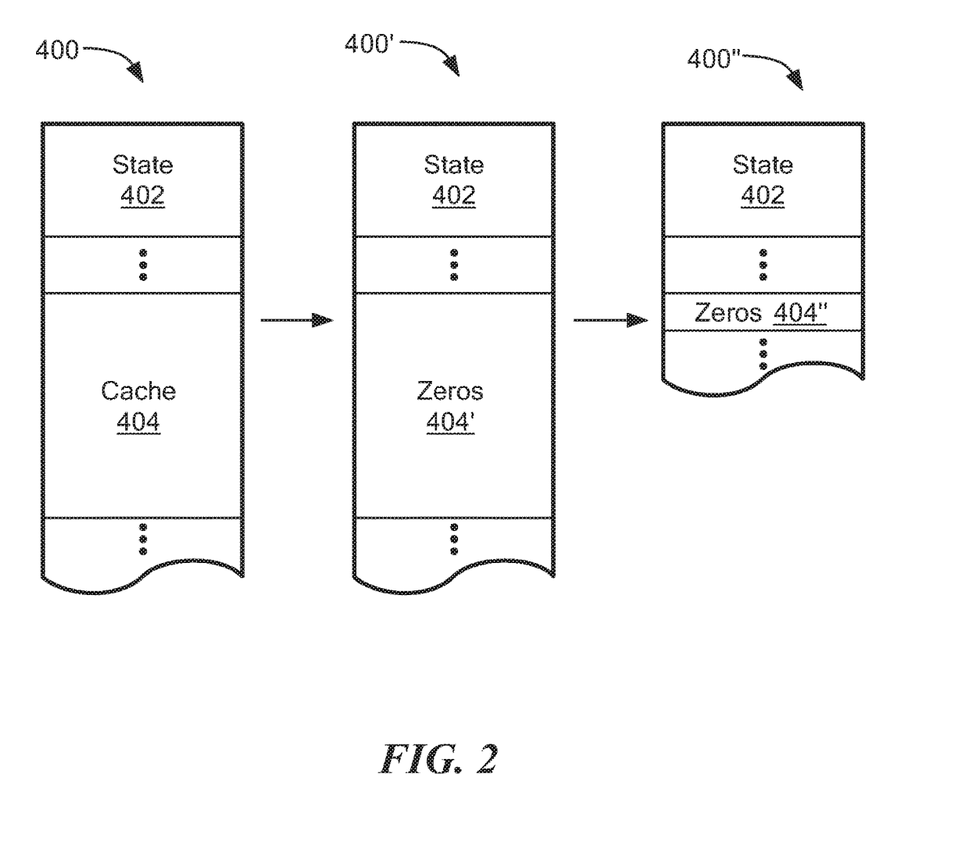
FIG. 2 is a diagram of illustrative memory snapshot, according to an embodiment of the disclosure.

Referring to FIG. 2, a VM memory snapshot 400 includes state 402 and cache 404, according to an embodiment. State 402 corresponds to memory contents utilized by the guest OS, system processes, and application processes during normal operation. State includes memory contents required to restore the state of the VM to the point in time when a snapshot was generated. In one embodiment, state may include text and data pages used by the VM's guest OS and processes. Referring again to FIG. 2, cache 404 corresponds to memory used various caching subsystems within the VM. In some embodiments, cache includes pages maintained by a filesystem cache within the guest OS. In many embodiments, cache can improve system performance (e.g., by reducing I/O), but is not relied upon by system- or application-level processes to provide correct operation. For example, filesystem cache data can be readily invalidated without causing processes that use the filesystem to operate incorrectly. In many embodiments, particularly where the VM is configured as a server, the cache portion of a memory snapshot may be significantly larger than the state portion.

In various embodiments, the size of the memory snapshot can be reduced by overwriting at least a portion of cache with zeros (or another constant value), invalidating corresponding cache structures, and then compressing the memory snapshot.

In the embodiment of FIG. 2, the memory snapshot 400 is generated with the cache 404 in tact. The memory snapshot 400 may then be post-processed to zero out portions of the cache 404 and to invalidate corresponding cache structures, resulting in a modified version of the snapshot referred to herein as the "cache-invalidated snapshot" 400'. The cache-invalidated snapshot 400' can then be compressed, resulting in a compressed snapshot 400" that may be significantly smaller than the original snapshot 400. In some embodiments, the cache-invalidated snapshot can be compressed explicitly using a lossless compression technique such as DEFLATE, LZ77, Huffman coding, LZW, Burrows-Wheeler, etc. In other embodiments, the cache-invalidated snapshot may be stored within a de-duplicated storage system (e.g., EMC DATA DOMAIN©) that automatically compresses data by storing only unique data chunks. Referring to FIG. 2, in either case, the compressed snapshot 400" can be decompressed to recover the cache-invalidated memory snapshot 400', which can then be used to restore the VM.

In some embodiments, the memory snapshot may be generated by the hypervisor's snapshot manager (e.g., snapshot manager 318 of FIG. 1). In other embodiments, the hypervisor's snapshot manager may be configured to generate memory snapshots and to perform post-processing thereon.

In some embodiments, a memory analysis tool, such as The Volatility Framework, can be used to obtain information about cache structures within a memory snapshot. Such information may include the location of cache structures with the memory snapshot, in addition to the structure and contents of cache data. In various embodiments, OS-level and/or system-level cache structures may be zeroed out. In the case of a VM running WINDOWS or Linux as the guest OS, the cache data structures used by those OS's are well known. In some embodiments, application-level cache structures may be zeroed out and corresponding internal application cache data structures may be invalidate. Information about cache data structures used by open-source applications can be obtained using the application source code. Information about cache structures used in closed-source applications may be obtained using available documentation and/or by reverse engineering specific versions of those applications.

In some embodiments, the memory snapshot includes one or more pages used by the guest OS's filesystem cache. Each page may have a flag (e.g., a bit) indicating if the contents of that page are valid or invalid at any given time. The filesystem cache does not return cached data to a user/process if the corresponding page is marked as invalid. Instead, it will issue a read request to storage as needed. Other types of caches (e.g., application-specific caches) may use different types of cache structures that can likewise be invalidated.

Referring back to FIG. 2, once information about cache 404 structures has been obtained, the cache data stored therein may be zeroed out the cache structures marked as invalid. When the VM is restored using the memory snapshot, the corresponding caching subsystems will be signaled that the cache data is invalid and should not be used.

In many embodiments, there is a tradeoff between VM performance following a restore and the size of memory snapshots. For example, in the case of a filesystem cache, the more cache pages that are invalidated, the more data the VM may need to fetch from storage when it is restored. In some embodiments, the desired memory snapshot size can be configured (e.g., by an administrator) on a per-VM basis. In one embodiment, a configuration setting can be used to select the cache structures to be invalidated when the memory snapshot is post processed. In certain embodiments, a least-recently used (LRU) heuristic may be used to select the cache structures (e.g., pages of filesystem cache) to be invalidated.

Figure 3:
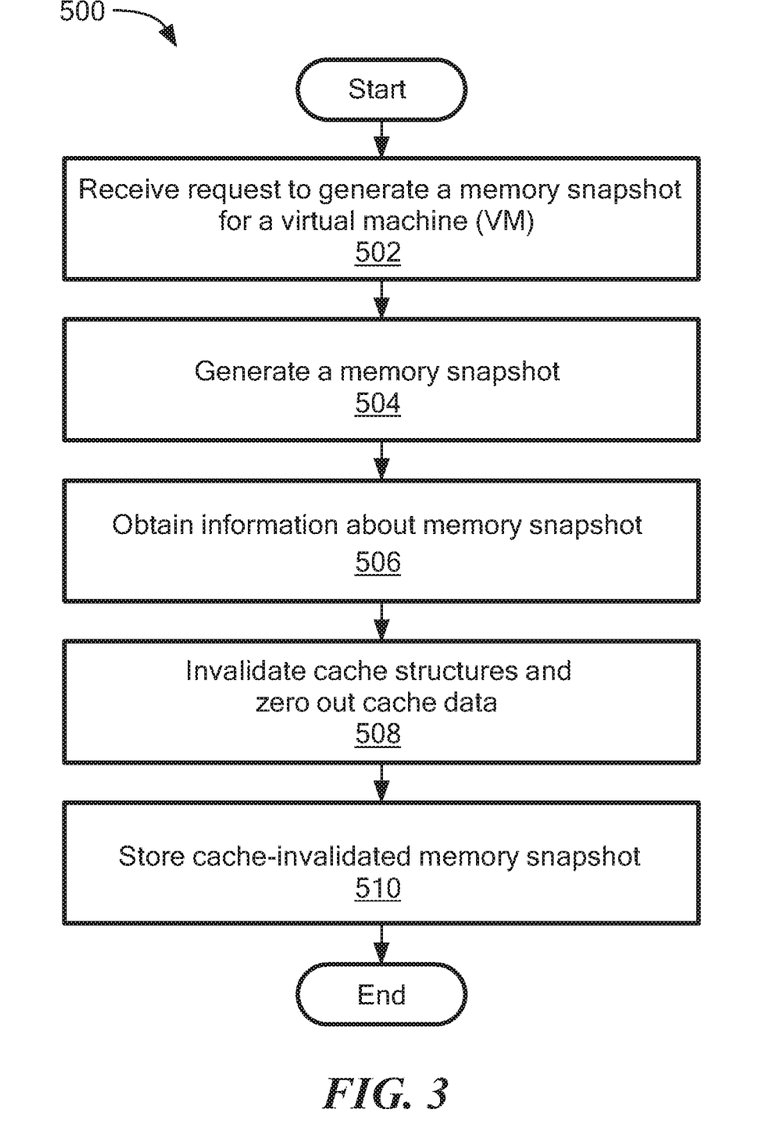
FIG. 3 is a flow diagram of a method for compressing memory snapshots, according to an embodiment of the disclosure.

FIG. 3 is a flow diagram showing illustrative processing that can be implemented within a system to compress memory snapshots (e.g., system 300 of FIG. 1). In certain embodiments, at least a portion of the processing described herein may be implemented within a hypervisor (e.g., hypervisor 308 of FIG. 1). In one embodiment, at least a portion of the processing described herein may be implemented within a snapshot manager (e.g., snapshot manager 318 of FIG. 1). In a particular embodiment, at least a portion of the processing described herein may be implemented within a snapshot post-processor (e.g., snapshot post-processor 330 of FIG. 1).

Rectangular elements (typified by element 502 in FIG. 3), herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring to FIG. 3, a method 500 can be used to generate a VM memory snapshot, according to an embodiment of the disclosure. At block 502, a request is received to generate a memory snapshot for a VM. At block 504, the contents of the VM's memory are copied (or "dumped") to generate a memory snapshot. The memory snapshot may include state and cache, as discussed above in conjunction with FIG. 2.

At block 506, information about cache structures within the memory snapshot is obtained. In certain embodiments, the cache structures may include pages used by a filesystem cache or a buffer cache (e.g., the buffer cache used within Linux systems). In some embodiments, an OS-specific driver may be used to obtain information about cache structures within the memory snapshot. In various embodiments, the cache structures may include cache structures used by application processes running in the VM. In this case, the application cache may be different from the OS filesystem cache. For example, a database application may include its own cache structures.

Referring back to FIG. 3, at block 508, at least one of the cache structures is invalidated and the corresponding cache data overwritten by zeros (or another constant value). In some embodiments, the method may use a LRU heuristic to select the cache structures to be invalidated.

Referring again to FIG. 3, at block 510, the cache-invalidated memory snapshot is stored. In some embodiments, the cache-invalidated memory snapshot may be stored to a deduplicated storage system. In other embodiments, the memory snapshot may be compressed before it is stored using a compression algorithm.

The compressed memory snapshot may be decompressed and used to restore the VM.

Figure 4:
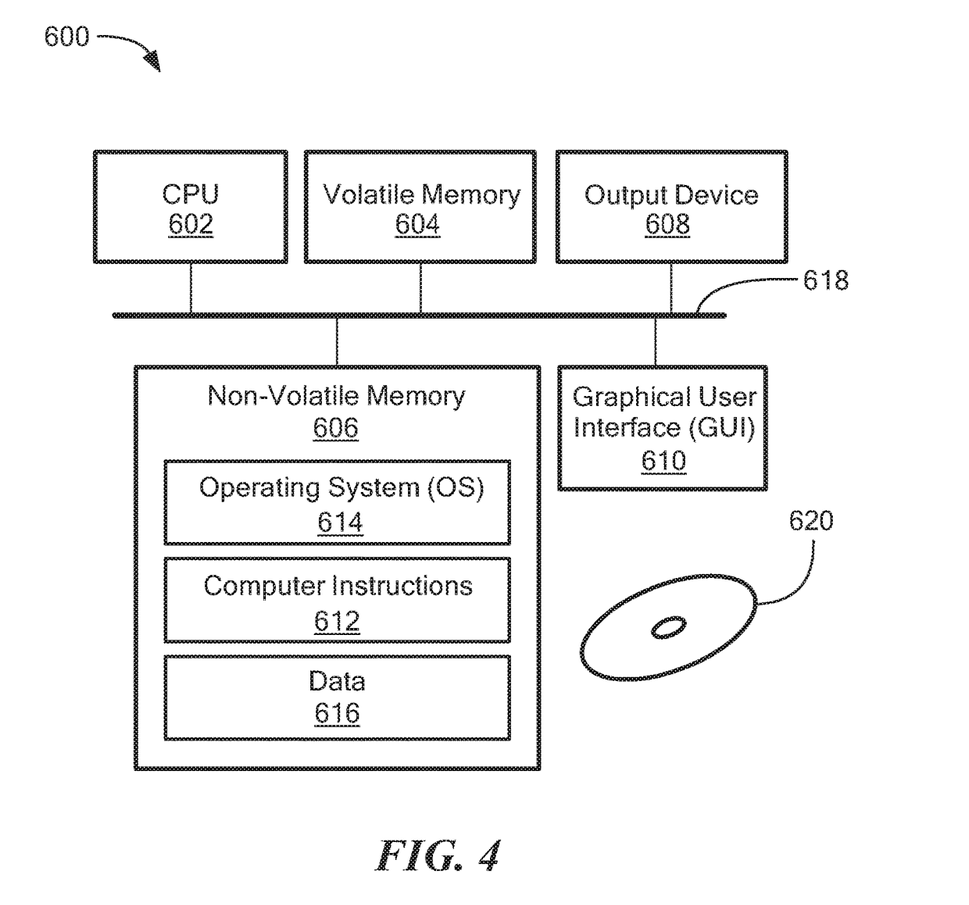
FIG. 4 is a block diagram of a computer on which the method of FIG. 3 may be implemented, according to an embodiment of the disclosure.

FIG. 4 shows a computer 600 that can perform at least part of the processing described herein, according to one embodiment. The computer 600 may include a processor 602, a volatile memory 604, a non-volatile memory 606 (e.g., hard disk), an output device 608 and a graphical user interface (GUI) 610 (e.g., a mouse, a keyboard, a display, for example), each of which is coupled together by a bus 618. The non-volatile memory 606 may be configured to store computer instructions 612, an operating system 614, and data 616. In one example, the computer instructions 612 are executed by the processor 602 out of volatile memory 604. In one embodiment, an article 620 comprises non-transitory computer-readable instructions. In some embodiments, the computer 600 corresponds to a virtual machine (VM). In other embodiments, the computer 600 corresponds to a physical computer.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A method comprising:
receiving a request to generate a memory snapshot for a virtual machine (VM);
generating a memory snapshot of the VM's memory, the memory snapshot including a first portion that represents a state of the VM's memory and a second portion that represents a state of a cache that is associated with the VM's memory;
identifying a configuration setting that specifies a cache management policy for invalidating contents of the cache that is associated with the VM's memory;
post-processing the memory snapshot based on the configuration setting, the post-processing including zeroing out cache data within the second portion of the memory snapshot based on the configuration setting; and
compressing the memory snapshot after zeroing out corresponding cache data within the second portion of the memory snapshot, and storing the memory snapshot to storage.

2. The method of claim 1 further comprising invalidating one or more cache structures in the cache that is associated with the VM's memory.

3. The method of claim 2 wherein invalidating the one or more cache structures comprises erasing the one or more cache structures.

4. The method of claim 3 wherein erasing the one or more cache structures from cache comprises setting an invalid bit within each of the one or more cache structures.

5. The method of claim 2 further comprising obtaining information about the one or more cache structures, wherein obtaining information about the one or more cache structures includes obtaining information about cache structures used by application processes running within the VM.

6. The method of claim 2 wherein invalidating the one or more cache structures comprises selecting the one or more cache structures using a least-recently used (LRU) heuristic.

7. The method of claim 1 wherein at least a portion of the post processing is performed using a driver specific to a guest operating system (OS) of the VM.

8. The method of claim 1 wherein storing the memory snapshot to storage comprises storing the compressed memory snapshot to a deduplicated storage system.

9. The method of claim 1 further comprising:
retrieving the memory snapshot from storage; and
restoring the VM using the retrieved memory snapshot.

10. A system comprising:
one or more processors;
a volatile memory; and
a non-volatile memory storing computer program code that when executed on the processor causes execution across the one or more processors of a process operable to perform the operations of:
receiving a request to generate a memory snapshot for a virtual machine (VM);
generating a memory snapshot of the VM's memory, the memory snapshot including a first portion that represents a state of the VM's memory and a second portion that represents a state of a cache that is associated with the VM's memory;
identifying a configuration setting that specifies a cache management policy for invalidating contents of the cache that is associated with the VM's memory;
post-processing the memory snapshot based on the configuration setting, the post-processing including zeroing out corresponding cache data within the second portion of the memory snapshot; and
compressing the memory snapshot after zeroing out corresponding cache data within the second portion of the memory snapshot, and storing the memory snapshot to storage.

11. The system of claim 10 wherein the one or more processors are further operable to perform the operation of invalidating one or more cache structures in the cache that is associated with the VM's memory.

12. The system of claim 11 wherein invalidating the one or more cache structures comprises erasing the one or more cache structures.

13. The system of claim 12 wherein erasing the one or more cache structures from cache comprises setting an invalid bit within each of the one or more cache structures.

14. The system of claim 10 wherein:
the one or more processors are further operable to perform the operation of obtaining information about one or more cache structures, and
obtaining information about the one or more cache structures within the memory snapshot includes obtaining information about cache structures used by application processes running within the VM.

15. The system of claim 11 wherein invalidating the one or more cache structures comprises selecting the one or more cache structures using a least-recently used (LRU) heuristic.

16. The system of claim 10 wherein at least a portion of the post-processing is performed using a driver specific to a guest operating system (OS) of the VM.

17. The system of claim 10 wherein storing the memory snapshot to storage comprises storing the compressed memory snapshot to a deduplicated storage system.

18. A computer program product tangibly embodied in a non-transitory computer-readable medium, the computer-readable medium storing program instructions that are executable to:
receive a request to generate a memory snapshot for a virtual machine (VM);
generate a memory snapshot of the VM's memory, the memory snapshot including a first portion that represents a state of the VM's memory and a second portion that represents a state of a cache that is associated with the VM's memory;
identify a configuration setting that specifies a cache management policy for invalidating contents of the cache that is associated with the VM's memory;
post-process the memory snapshot based on the configuration setting, the post-processing including zeroing out corresponding cache data within the second portion of the memory snapshot; and
compress the memory snapshot after zeroing out corresponding cache data within the memory snapshot and store the memory snapshot to storage.

* * * * *